Aug. 7, 1962   G. O. BENTELE ETAL   3,048,514
METHODS AND APPARATUS FOR MAKING INFLATABLE CUSHIONS
Filed Sept. 17, 1958   4 Sheets-Sheet 4

INVENTORS
GERARD O. BENTELE
CHARLES M. McCLURE
BY David B. Miller
ATTORNEY

United States Patent Office 3,048,514
Patented Aug. 7, 1962

3,048,514
METHODS AND APPARATUS FOR MAKING INFLATABLE CUSHIONS
Gerard O. Bentele, South Bend, Ind., and Charles M. McClure, Niles, Mich., assignors to United States Rubber Company, New York, N.Y., a corporation of New Jersey
Filed Sept. 17, 1958, Ser. No. 761,554
19 Claims. (Cl. 156—145)

This invention relates to processes of and apparatus for producing inflatable seat cushions, mattresses and like articles, and in particular, seat cushions adapted for use in automotive vehicles.

Inflated seat cushions having a normally substantially plane or flat upper surface and including a horizontal top section and a plurality of downwardly depending lobes affixed thereto and constituting the supporting base therefor are known in the art. One type of cushion, having these characteristics, is illustrated in U.S. Patent No. 2,488,993 to M. C. Teague, issued November 22, 1949, and assigned to the assignee of the instant application. As described in the Teague patent, the primary purpose of cushions constructed as there illustrated is to reduce to a minimum the variation of pressure from one point of the seat of a passenger to the next, so as to increase riding comfort and reduce fatigue on long drives. Stated in other words, the basic advantages of such a lobed seat cushion are an optimum distribution of pressures on the passenger over the surface of the cushion and maximum stability of the seat during drives over rough as well as smooth roads.

Heretofore, however, difficulties have been encountered in developing production techniques and apparatus lending themselves to manufacture of fault-free seat cushions of this type on a large scale, economical basis.

It is, therefore, one of the principal objects of the present invention to provide processes of and apparatus for producing seat cushions of the aforesaid type in as simple and economical a manner as possible.

It is another important object of the present invention to provide means enabling a multi-lobe seat cushion for automotive vehicles to be produced with a minimum number of operational steps.

Still another object of the present invention is the provision of means facilitating formation of the cushion lobes in any predetermined manner depending on the riding characteristics to be imparted to the cushions.

Yet another object of the present invention is the provision of forming jigs in which uncured sheets of rubber or like material are initially shaped as desired and thereafter retained during a subsequent vulcanization or curing operation.

The foregoing and other objects, characteristics, and advantages of the present invention will be more fully understood from the following detailed description thereof when read in conjunction with the accompanying drawings, in which.

Figure 1:
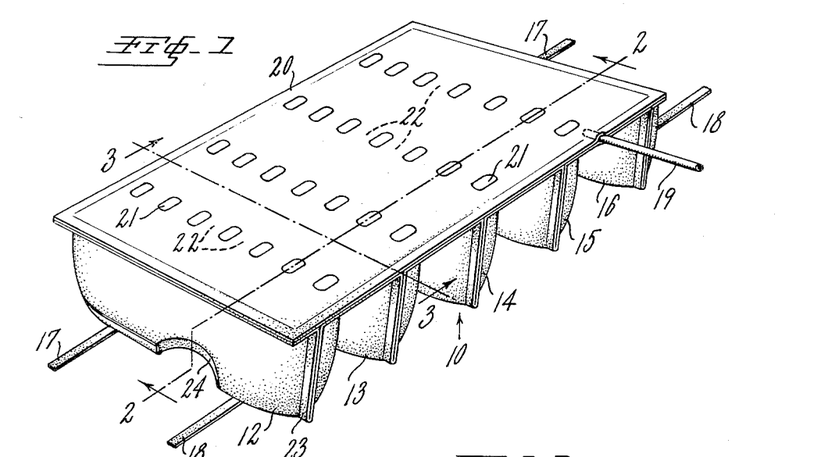
FIG. 1 is a perspective view of a seat cushion produced in accordance with the present invention.
Figure 2:
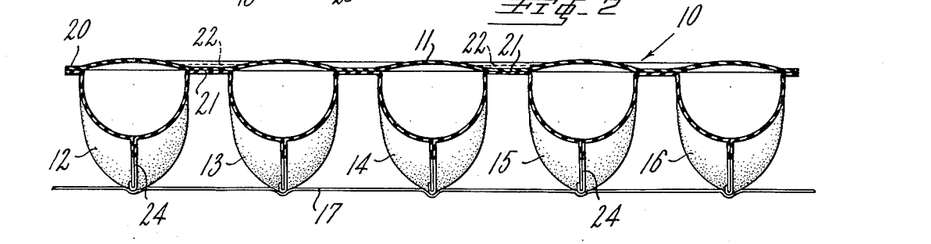
FIG. 2 is a sectional view taken along the line 2—2 of FIG. 1.
Figure 3:
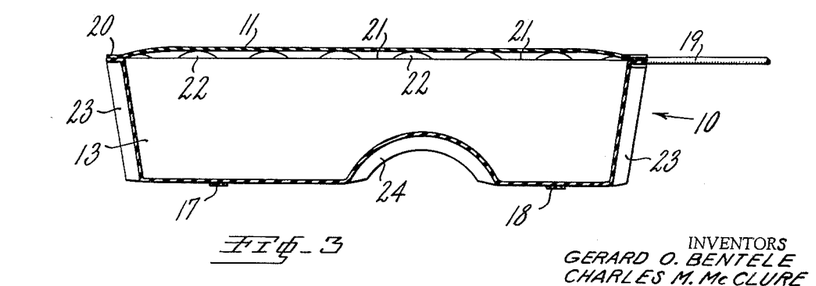
FIG. 3 is a sectional view taken along the line 3—3 of FIG. 1.

Referring now more particularly to FIGS. 1 to 3 of the drawings, it will be seen that a seat cushion 10 of the type to be produced in accordance with the principles of the present invention has an upper or seating portion 11 the surface of which is substantially plane or flat, and a lower or supporting portion consisting of a plurality of downwardly depending lobes 12, 13, 14, 15 and 16. The cushion is inflated with air, and the lobes are retained in essentially parallel relationship by straps 17 and 18 bonded to the lowermost borders of the lobes at respective locations spaced from one another transversely of the cushion. Inflation may be effected by means of a tube 19 which may be provided with an inlet valve (not shown) in the same manner as an ordinary inner tube of a pneumatic tire. As will appear more fully hereinafter, the upper and lower portions of the cushion 10 are formed from individual calendered sheets of rubber (natural or synthetic) or like elastic material, which sheets are bonded to each other, preferably by vulcanization, along their marginal regions, as shown at 20, and at a plurality of isolated inner regions, as shown at 21, thus forming a plurality of channels 22 between the adjacent, unbonded portions of the two sheets. The lobes 12 to 16 are formed only from folds of the lower sheet which are individually sealed at their lateral marginal regions, as shown at 23, each lobe being provided with a median, not necessarily centrally located, upward arch 24.

Thus, air admitted through the tube 19 will flow through the various channels 22 to inflate the lobes 12 to 16 until pressure therein is sufficient to provide the desired riding comfort. Although five lobes are shown, more or fewer may be provided. The theory underlying the structure of the cushion 10, which also depends on the manner in which the cushion is to be used, i.e., with or without cloth coverings, padding, etc., is fully set forth in the above-mentioned Teague patent and thus need not be repeated herein inasmuch as the cushion per se forms no part of the present invention.

From the foregoing it will be readily appreciated that the process of making a cushion as aforesaid involves, according to one embodiment of the invention, the steps of forming a plurality of lobe-defining folds in a first sheet of uncured, tacky rubber or like material and then superposing onto the unfolded portions of this sheet a second sheet of uncured, tacky rubber or the like, means being provided not only between the facing surfaces of the sheets but also between the adjacent, inner lobe face-defining surfaces of the folds of the first sheet to prevent any adhesion between such surfaces, both prior to and during the curing or vulcanization procedure, except at the marginal regions 20 and 23 and the inner regions 21 referred to hereinabove. The preferred manner of carrying out this process comprises the steps of supporting a first sheet of tacky, uncured rubber or the like on a flat surface, providing a plurality of gaps in said surface beneath the sheet, effecting a relative approaching movement of the opposite ends of the sheet to cause the portions of the same overlying the gaps in the supporting surface to drape downwardly into the gaps so as to form a plurality of lobe-defining folds, pressing the folds in a direction transverse to their longitudinal dimension to cause adhesion at the marginal regions thereof while inhibiting adhesion at all other portions of the inner lobe face-defining surfaces of the various folds, placing a second sheet of tacky, uncured rubber or the like onto the still flat portions of the first sheet, and pressing the first and second sheets together to cause adhesion therebetween only at the marginal regions thereof and at predetermined, isolated inner regions thereof while inhibiting adhesion at all other locations. The finished assembly is then placed into a curing chamber where it is subjected to vulcanizing temperatures in a manner well known to the art.

In accordance with the present invention, the means for limiting the adhesion between facing portions of the two sheets or between facing inner surfaces of the lobe-forming folds to definite preselected regions may comprise a matrix or pattern made of paper or other adhesion-resistant material in which are cut or otherwise provided a plurality of slots or other appropriately shaped apertures, ensuring that, although pressure is applied to the sheets uniformly over their entire area, adhesion can take place only where the sheets come in contact with each other through the aforesaid slots or apertures. Such a matrix, of course, is permanently incorporated in the cushion, and a different matrix must be employed for each cushion made.

Alternatively, the limiting of the adhesion to preselected regions of the sheets may be effected through a suitable shaping of the surfaces of the apparatus in which the cushion is formed. In such a case, it is only necessary to coat the sheets with an anti-tack or adhesion-inhibiting medium, preferably zinc stearate, capable of preventing any adhesion even during the vulcanization or curing operation (without, however, interfering in any way with the actual vulcanization or curing of the sheets themselves) except at those locations where a sufficient amount of pressure is applied to overcome the effect of this medium. The manner of practicing this embodiment of the process of the invention will be more fully explained hereinafter in connection with the apparatus shown in FIGS. 7 and 8.

Figure 4:
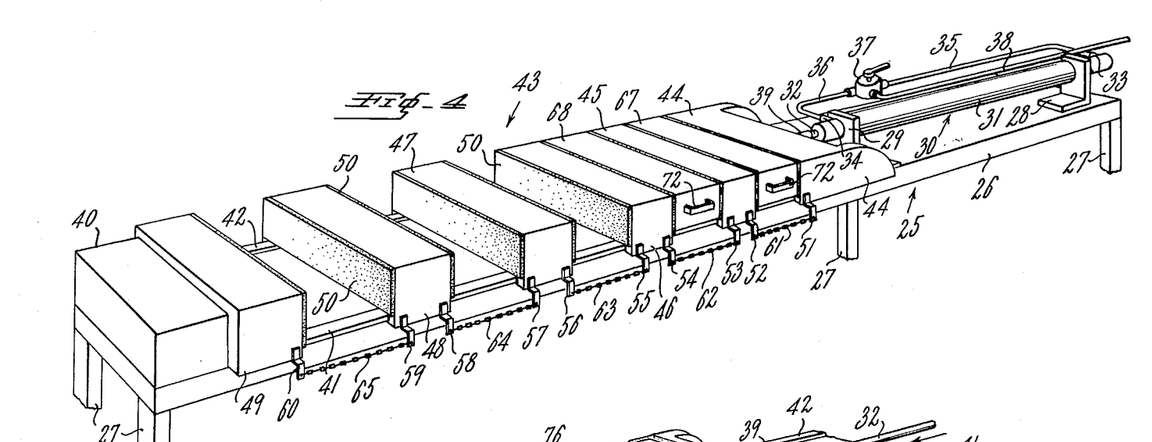
FIG. 4 is a perspective elevational view of one form of cushion-forming apparatus constructed in accordance with the present invention and as it appears prior to use, some parts being omitted for the sake of clarity.
Figure 5:
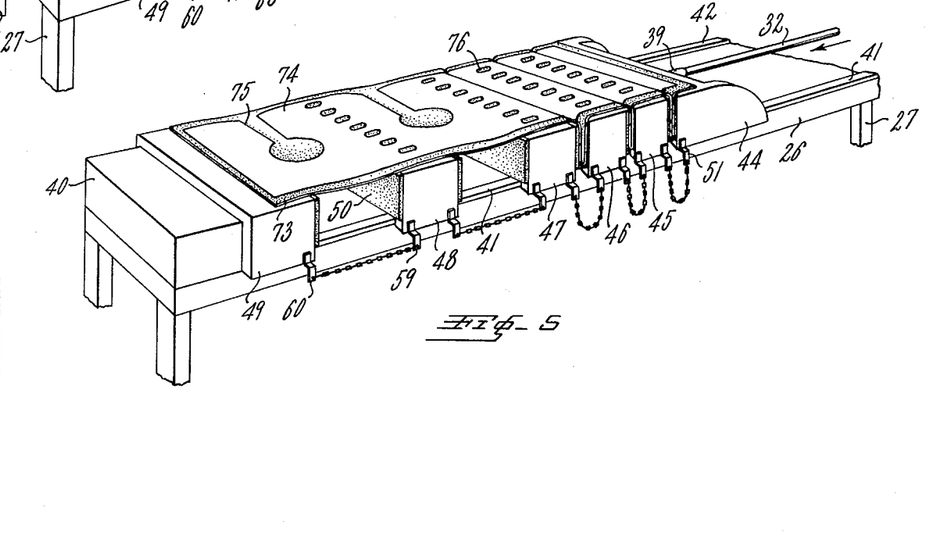
FIG. 5 is a similar view of the apparatus of FIG. 4, showing the latter in an intermediate stage of operation.
Figure 6:
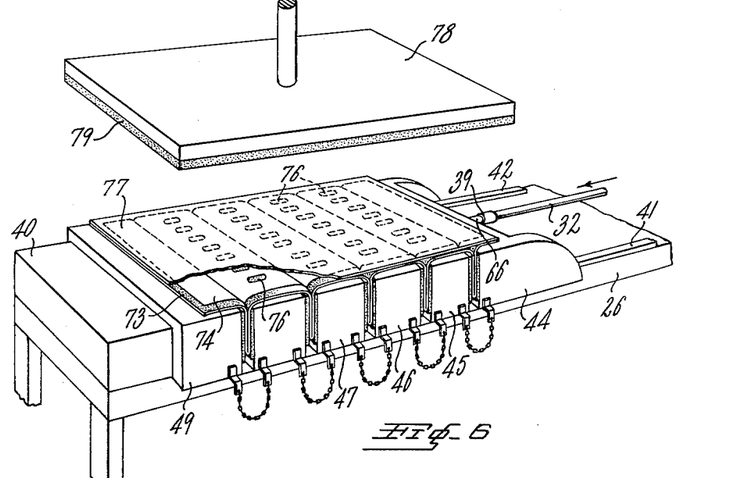
FIG. 6 is a perspective view of the apparatus of FIG. 4 showing the same in its final stage of operation.

Turning now to FIGS. 4, 5 and 6, it will be seen that an apparatus utilizable in practicing the first of the above-mentioned processes for forming a cushion such as illustrated in FIG. 1 comprises an elongated table 25 having a horizontal platform 26 and legs 27. Mounted at one end of the platform 26 are two longitudinally spaced brackets 28 and 29 which rigidly support a conventional double-acting pneumatic motor 30 including a cylinder 31 and a piston (not shown) reciprocal therein and having a piston rod 32 extending slidably out of the cylinder. The cylinder 31 is provided at its opposite ends with ports 33 and 34 communicating with conduits 35 and 36, respectively, which in turn lead to a manually operable three-way valve 37 the inlet port of which communicates with a supply conduit 38 leading to a suitable source (not shown) of compressed air or other pressure fluid. The free end of the piston rod 32 carries a coupling sleeve 39 for a purpose to be more fully described hereinafter.

Rigidly positioned atop the table platform 26 and at the end thereof remote from the pneumatic motor 30 is an abutment or bumper block 40. Two guide rails 41 and 42 are fixedly mounted on the upper surface of the platform 26 at the opposite sides thereof.

The actual means in which the lobes 12 to 16 of the cushion 10 shown in FIG. 1 are formed comprises a jig 43 which is constituted by a plurality of separable presser blocks 44, 45, 46, 47, 48 and 49 which are provided on their opposite surfaces with pads 50 of an expanded resilient, rubber-like material, the purpose of which will become apparent presently. The blocks 44 to 49 are recessed at their respective bases and slidably mounted on the rails 41 and 42, the recesses being sufficiently wide to enable the opposite side walls of each presser block to extend over the corresponding sides of the rails 41—42 and the platform 26 when the blocks are mounted on the same. In this manner the presser blocks are linearly guided and retained on the platform 26 and the rails 41—42. Projecting from each side wall of the slidable presser block 44, adjacent the inwardly facing surface thereof, is a small bracket 51 (only one of which is shown), and from each side wall of each of the presser blocks 45, 46, 47 and 48 adjacent the opposite faces thereof project two similar brackets 52—53, 54—55, 56—57 and 58—59, respectively (only two such brackets being shown for each block). Adjacent the inwardly facing edge of each side wall of the block 49 is provided a similar bracket 60. Chains 61, 62, 63, 64 and 65 are connected to the adjacent brackets of each pair of adjacent presser blocks.

Attached to the rear face of the first presser block 44 is a small connector rod 66 which is constructed to be grippingly engaged by the coupling sleeve 39 mounted on the piston rod 32, for the purpose of connecting the latter to the block 44. As will be readily understood, such a connection may be effected by means of a bayonet pin and slot on the sleeve and connector rod, by means of a pair of mating flanges, by means of internal threading on the sleeve and external threading on the connector rod, by means of spring-pressed latches, etc., and it is, of course, possible to eliminate the sleeve altogether by simply tying the connector rod 66 and piston rod 32 to one another with the aid of string, tape or the like. As a result, the jig 43, upon connection of the connector rod 66 to the piston rod 32, can be both expanded to its starting condition due to the presence of the chains 61 to 65 which transmit the pull of the piston rod successively to the various blocks 45 to 48, as clearly shown in FIG. 4, and compressed to its final condition as shown in FIG. 6, to be more fully described hereinbelow.

As can be seen from FIG. 4, when the jig 43 is fully expanded prior to being used in a cushion-forming operation, the presser blocks 44 to 49 are spaced from one another. In order to fill these gaps so as to present a continuous flat surface for the initial step of the cushion-forming process according to the present invention, there is provided a plurality of spacer blocks 67, 68, 69, 70 and 71 (see also FIG. 7), each of which has a handle 72 and is adapted to be inserted into and removed from a respective gap between adjacent ones of the presser blocks 44 to 49.

The manner in which the cushion-forming process is carried out will now be readily apparent. Assuming that the jig 43 is fully expanded to the extent permitted by the chains 61 to 65, with all gaps filled by spacer blocks 67 to 71, there is first placed onto the support surface formed by the presser and spacer blocks a sheet 73 of tacky, uncured rubber which may, if desired, be coated with powdered zinc stearate or any other suitable anti-tack agent. By way of example, some types of soaps, or even bentonite (which is composed principally of aluminum silicate) may be employed in lieu of zinc stearate. As stated hereinbefore, however, any anti-tack agent used must have the property of inhibiting adhesion of the rubber to any surface or to another sheet of rubber prior to vulcanization thereof and when not subjected to external pressure, but the agent must be such as not to interfere with vulcanization operation per se. The length of sheet 73 is only slightly less than that of the fully expanded jig 43.

Once the sheet 73 is in position, a matrix or pattern 74, made of paper or like material, is placed thereon. The matrix is slightly shorter and narrower than the sheet 73 (see FIG. 5) so as to leave the entire marginal area of the latter open, and is further provided with a plurality of key-shaped slots 75 and with a plurality of relatively short, isolated slots or apertures 76 extending in parallel rows from one side of the pattern to the other. Thus, not only are the marginal areas of the sheet 73 left uncovered, but also those inner regions thereof underlying the slots 75 and 76. The position of the matrix 74 is so predetermined that the slots 75 are centered over the spacer blocks, respectively, while each row of slots 76 overlies a respective presser block.

The spacer blocks 67 to 71 are now drawn out of their resting places between the presser blocks 44 to 49 so as to introduce a plurality of gaps into the sheet-supporting surface. Upon suitable manipulation of the valve 37, air under pressure is now admitted from conduit 38 via conduit 35 to the rear end of the cylinder 31, whereupon the piston thereof, and also the piston rod 32, are moved to the left as viewed in FIGS. 4 and 5 so as to displace the presser block 44 toward the block 45 (which is still stationary). During this initial movement, that portion of the sheet 73 and pattern or matrix 74 overlying the gap previously occupied by the spacer block 67 will drape downwardly into said gap into the form of a flat-sided fold. When the presser block 44 now reaches the adjacent presser block 45, confining the fold of the sheet between the respective expanded rubber-like material pads 50, further displacement of the block 44 under the influence of motor 30 will cause the block 45 to be shifted to the left, thereby permitting that portion of the sheet 73 and key-slotted matrix 74 overlying the gap previously occupied by the second spacer block 68 to drape downwardly into this gap so as to form another flat fold. Thereafter, the next presser block 46 is displaced to the left, and so on in sequence, until all the presser blocks are essentially abutting against one another, with the last block 49 contacting the bumper block 40, as shown in FIG. 6, at which time all those portions of the sheet 73 and matrix 74 overlying the gaps between the presser blocks are draped downwardly between the latter into flat folds as previously described. All of the slots 76, of course, remain in the original plane of the sheet.

Sufficient pressure is now applied to the jig in a direction transverse to the longitudinal dimension of the folds of the sheet 73 by applying pressure to the bumper block 40, which in this operation becomes a presser block, and by applying pressure to presser block 44 (i.e., longitudinally of the sheet itself) by continued operation of motor 30 to effect at least a preliminary adhesion between any contacting surfaces of the sheet which are not separated by the paper matrix. The expanded rubber-like material pads 50 serve to obtain a uniform pressure distribution over the areas of the folds. Thus, the inner surfaces of the folds will be caused to adhere to one another at their lateral marginal regions and also at the nadirs of the folds, especially at those portions thereof coinciding with the now ladle-shaped recesses defined by the medially folded key-shaped slots 74. The folds, therefore, are sealed at three of their sides and accordingly constitute a plurality of hollow lobes depending downwardly from the still flat portions of the sheet 73.

As soon as this step has been completed, a second sheet 77 of tacky, uncured rubber or the like, possibly also coated with an anti-tack agent as set forth hereinabove, is positioned over the flat remainder of the sheet 73 and matrix 74. As best shown in FIG. 6, the width of the sheet 77 is the same as that of the sheet 73, and the length of the sheet 77 is substantially equal to the combined length of the flat portions of the sheet 73, the sheet 77 thus being considerably shorter than the sheet 73 originally placed onto the supporting surface defined by the presser blocks 44 to 49 and the spacer blocks 67 to 71. Pressure is now applied to the so-assembled sheets by means of a suitable platen 78 having a contact surface covered with a pad 79 of expanded rubber-like material or the like. The platen 78 may be merely a weighted plate or it may comprise a part of a press or like device. This pressure, uniformly distributed by the pad 79 over the area of the sheets, forces those portions of the latter not separated by the matrix 74 to adhere to one another. Thus, adhesion between the sheets will be effected at the marginal areas thereof (designated 20 in FIGS. 1 to 3) and also at those isolated regions (designated 21 in FIGS. 1 to 3) corresponding to the locations of the slots 76 in the pattern 74. Although not explicitly shown in FIG. 6, an air inlet tube (designated 19 in FIGS. 1 to 3) may be incorporated in the assembly at this time.

The imperforate portions of the matrix or pattern 74 ensure that no adhesion will take place at any corresponding locations, from which it will be seen that not only will the folds or lobes (as they may now be called) be hollow, but that open passageways (designated 22 in FIGS. 1 to 3) will be formed to establish communication between the various lobe interiors and the air inlet tube. The entire jig and sheet assembly may now be removed and subjected to heat so as to cure the rubber, in a manner well known to the art. Tie straps (designated 17 and 18 in FIGS. 1 to 3) may be attached in any desired manner, and the cushion, when inflated, will look as shown in FIG. 1. It will, of course, be understood that when a matrix 74 is used, the sheets 73 and 77 need not be coated with any additional anti-tack agent.

Figure 7:
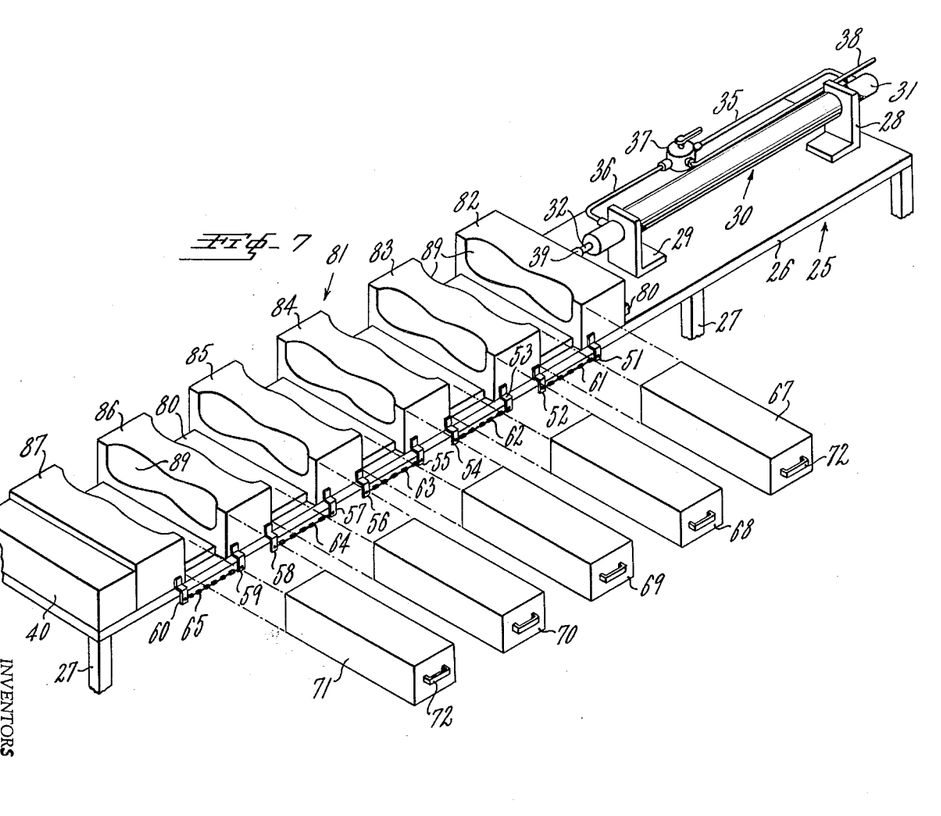
FIG. 7 is a perspective, somewhat exploded view of a modified embodiment of the apparatus for use in implementing the principles of the present invention.
Figure 8:
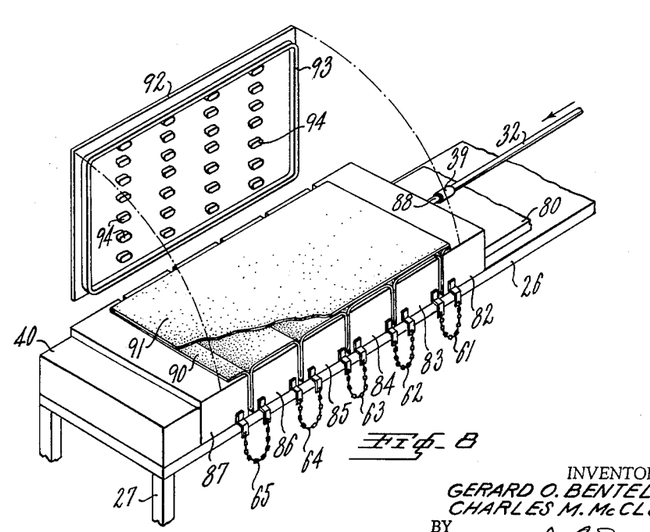
FIG. 8 is a perspective view of the apparatus of FIG. 7, showing the same in its final stage of operation.

A somewhat modified form of apparatus, designed for practicing the second of the hereinabove referred to embodiments of the process according to the present invention, is illustrated in FIGS. 7 and 8, and to the extent that this apparatus is identical with that of FIGS. 4 to 6 the same reference numerals will be employed. As in the first-described embodiment of the invention, there is provided a table 25 with a platform 26 and legs 27. Located at one end of the table platform 26 are two spaced brackets 28 and 29 on which is mounted the cylinder 31 of a double-acting pneumatic motor 30 controlled by a valve 37 and conduits 35, 36 and 38. The piston rod 32 of the pneumatic motor carries a coupling sleeve 39, and a bumper block 40 is mounted at the far end of the platform 26. In lieu of the rails 41 and 42 there is provided a guide track-defining plate 80 which is somewhat narrower than the platform 26.

The means for forming the seat cushion as shown in FIGS. 1 to 3 comprise, according to this embodiment of the invention, a jig 81 which includes a plurality of separable presser blocks 82, 83, 85, 86 and 87 which, as in the embodiment of FIGS. 4 to 6, are interconnected by chains 61 to 65 attached to small lateral brackets 51 to 60 projecting from the side walls of the various presser blocks. The presser block 82 is provided with a connector rod 88 (FIG. 8) adapted to be grippingly engaged by the coupling sleeve 39 carried by the piston rod 32. The presser blocks 82 to 87 are recessed at their bases to accommodate the guide plate 80. Again, as in the embodiment of FIGS. 4 to 6 there is provided a plurality of spacer blocks 67 to 71 having handles 72 and adapted to be inserted into the gaps between adjacent pairs of the presser blocks when the latter are separated to the extent permitted by the chains 61 to 65.

The presser blocks 82 to 87 differ somewhat in shape from those illustrated in FIGS. 4 to 6 by virtue of the fact that the opposing faces of the blocks are provided with shallow, concavely contoured recesses 89 the shapes of which correspond to the lobe contours to be attained. These presser blocks are not provided with contact or pressure pads of expanded rubber-like material as shown in FIG. 4, but it will, of course, be understood that such pads may be provided on the non-recessed portions of the block faces.

In carrying out the second embodiment of the process according to the present invention, the jig 81 is mounted on the table platform 26 over the guide plate 80, and the connector rod 88 is attached to the piston rod 32 by the coupling sleeve 39 (or by any other suitable means), whereafter the piston rod is retracted to expand the jig to its full length. The spacer blocks 67 to 71 are now inserted into the gaps between the presser blocks 82 to 87 so as to form a continuous, gapless supporting surface. Onto this surface is placed the first sheet 90 of tacky, uncured rubber or the like, the length of which is somewhat less than the expanded length of the jig. The sheet 90, according to this embodiment of the invention, however, must be coated with an anti-tack medium, such as zinc stearate, for reasons which will presently become clear.

The spacer blocks 67 to 71 are now removed from the jig 81 and the valve 37 actuated to cause the motor 30 to advance the piston rod 32 and therewith the first presser block 82. As a result, that portion of the sheet 90 overlying the gap between the blocks 82 and 83 will drape downwardly into the form of a flat fold. When the block 82 reaches the hitherto stationary block 83, the latter will be displaced to form a downwardly draped fold in that portion of the sheet 90 overlying the space between the blocks 83 and 84, and this will be continued until the jig is in the position shown in FIG. 8 with a fold of the sheet 90 disposed between each adjacent pair of presser blocks. Continued pressure is applied by the pneumatic motor 30 to effect at least a preliminary adhesion between any contacting portions of the inner surfaces of the folds, and reference to FIG. 7 will show that such adhesion will occur only along the boundaries of the recesses 89. No adhesion at all will occur between those surfaces of the folds aligned with the recesses 89.

Upon completion of this step, a second sheet 91 of tacky, uncured rubber or the like coated with an antitacky agent is placed on the still flat remainder of the first sheet 90. The width of the sheet 91 is the same as that of the sheet 90, but the length of the sheet 91 is considerably less than that of the original sheet 90, being equal only to the combined length of the flat portions of the first sheet.

The sheets are now subjected to pressure by means of a platen or like member 92, which may be a part of a press or an independent weighted element. The platen or press plate 92 differs from the platen 78 described in connection with FIG. 6 in that it is provided with a raised ridge 93 extending along its entire periphery and with a plurality of parallel rows of isolated raised islands or projections 94, the height of these islands and that of the ridge 93 being exactly the same. Thus it will be seen that when the platen 92 is pressed against the sheets 91 and 90, pressure sufficient to cause adhesion between said sheets will be applied to the latter only at the peripheral or marginal region contacted by the ridge 93 and at a plurality of inner isolated regions contacted by the islands 94. The ridge 93 and islands 94 thus accomplish exactly the same result as the slotted matrix or pattern 74, and it is, therefore, possible to completely eliminate the use of a paper matrix when proceeding with the apparatus according to FIGS. 7 and 8. As in the previously described embodiment of the invention, a tube such as 19 (FIG. 1) may be incorporated in the assembly to permit subsequent inflation of the cushion.

If desired, the process of producing a seat cushion with the apparatus of FIGS. 7 and 8 may be slightly modified by partially inflating the assembled sheets 90 and 91 prior to the curing or vulcanizing thereof. In this manner, those portions of the folds formed in the sheet 90 and aligned with the recesses 89 will be deformed somewhat and brought into surface contact with the said recesses. Thus, each fold or lobe will have imparted to it a shape approximating the shape sought to be ultimately attained. When the curing operation is now carried out, the stresses to which the lobes will subsequently be subjected upon complete inflation of the cushion will be considerably less than they would have if the cushion had been vulcanized in flat condition. It will, of course, be readily appreciated that the conforming of the lobes or folds to the contours of the recesses 89 prior to the vulcanization step may be effected by suction applied to the exteriors of the lobes by any suitable means (not shown) rather than by the aforesaid partial inflation of the cushion.

The principles of the present invention, as will be readily understood, are applicable to other types of plastic materials than uncured rubber, and it may in some instances be possible to eliminate the curing step if the plastic material, say vinyl or the like, employed in forming the sheets 73 and 77 or 90 and 91 need not be subjected to a curing operation and the requisite amount of adhesion can be effected simply by pressure application or by heat sealing in situ. If a non-tacky sheet material is employed, it may be coated with an adhesive at those locations corresponding to the regions 20 and 21 shown in FIG. 1. The material of which the jigs 43 and 81 are made may be metal, preferably aluminum, or some type of synthetic plastic utilizing epoxy or phenolic resins. Under certain circumstances even wood may be found suitable. The only requirement to be observed is that the material of which the jigs are made be capable of withstanding the vulcanizing or heat sealing temperatures and incapable of interfering in any way with the actual vulcanization or heat sealing operation.

We have described preferred embodiments of our invention, but it is understood that this disclosure is only for the purpose of illustration and that various omissions and changes in shape, proportion and arrangement of the parts, as well as the substitution of equivalents for the arrangements or procedural steps shown and described, may be made without departing from the scope of the invention as set forth in the appended claims.

Having thus particularly described the invention, what is claimed and sought to be secured by Letters Patent is:

1. The method of producing an inflatable cushion, comprising the steps of forming a plurality of side-by-side, spaced folds on one face of a first sheet of plastic material, and bonding a second sheet of plastic material to the unfolded remainder of the other face of said first sheet along the marginal areas thereof as well as at a plurality of spaced and isolated inner areas thereof while bonding the adjacent inwardly facing surfaces of each of said folds to each other at their lateral edges, whereby said folds are transformed into hollow lobes open at the edges thereof adjacent said second sheet.

2. The method of producing an inflatable cushion, comprising the steps of forming a plurality of side-by-side, spaced folds on one face of a first sheet of plastic material, placing a second sheet of plastic material onto the unfolded remainder of the other face of said first sheet, and bonding the adjacent inwardly facing surfaces of each of said folds to each other at the opposite lateral edges thereof while bonding said second sheet to said unfolded remainder of said first sheet along the marginal areas thereof as well as at a plurality of spaced and isolated inner areas thereof, to thereby effectively seal the space between said sheets from the outside while retaining fluid-flow communication between the interiors of said folds.

3. The method of producing an inflatable cushion, comprising the steps of forming a plurality of folds in a first sheet of plastic material at one face thereof and at respective locations spaced from one another in a direction transverse to the longitudinal dimension of said folds, sealing the latter at their lateral edges to form hollow lobes open only at their upper edges in the plane of the remainder of said first sheet, positioning a second sheet of plastic material over the other face of said first sheet so as to cover said open edges of said lobes, and bonding said second sheet to said remainder of said first sheet at the marginal areas thereof and at a plurality of spaced and isolated inner areas thereof, to thereby effectively seal the space between said sheets from the outside while retaining fluid-flow communication between said lobes.

4. The method of producing an inflatable cushion, comprising the steps of forming in a first elongated sheet of plastic material a plurality of substantially parallel transverse folds all extending to one side of said first sheet at respective locations spaced from one another longitudinally of said first sheet, sealing said folds at their lateral edges to form hollow lobes open only at their upper edges in the plane of the remainder of said first sheet, positioning a second sheet of plastic material over said remainder of said first sheet so as to cover said open edges of said lobes, and bonding said second sheet and said remainder of said first sheet to one another only at the marginal areas thereof and at a plurality of spaced and isolated inner areas thereof, to thereby effectively seal the space intermediate said sheets from the outside while ensuring fluid-flow communication between said lobes.

5. The method of producing an inflatable cushion, comprising the steps of supporting a first sheet of uncured plastic material at the opposite end portions thereof and at a plurality of intermediate portions thereof spaced from one another and from said end portions in one direction of said first sheet, effecting a relative approaching displacement of said end and intermediate portions and simultaneously draping other spaced intermediate portions of said first sheet which alternate with said first-named intermediate portions downwardly relative to the latter so as to form a plurality of lobes, applying pressure to each of said lobes of said first sheet along said direction to effect adhesion of the marginal region of each inner lobe face to the marginal region of the adjacent and opposite inner lobe face while inhibiting adhesion of each pair of inner lobe faces to one another at all other regions thereof, positioning a second sheet of uncured plastic material over the supporting end and intermediate portions of said first sheet, pressing said second sheet and said supported portions of said first sheet against each other to effect adhesion of the former to the latter at the marginal areas thereof and at spaced and isolated inner areas thereof while inhibiting adhesion of said first and second sheets to one another at all other areas of contact therebetween, and curing the adhered sheets.

6. The method of claim 5, further comprising the step of placing onto said first sheet, while supported and prior to the relative approaching displacement of said end and intermediate portions thereof, a matrix sheet narrower and shorter than said first sheet and provided with a plurality of relatively long transverse key-shaped slots each extending from one side of the matrix approximately to the center thereof and spaced from one another longitudinally of said matrix and further provided with a plurality of relatively short isolated slots arranged in rows extending transversely of said matrix and alternating with said key-shaped slots, said second sheet being thereafter placed onto said matrix, said slots defining the locations at which adhesion between said sheets can take place.

7. The method of claim 5, in which said first and second sheets are coated with an anti-tack medium capable of preventing adhesion between asid sheets even during curing thereof except at those locations where pressure is applied, the step of applying pressure to said second sheet when positioned on said supported portions of said first sheet, being confined to a pressure application at said marginal and isolated inner areas of said sheets.

8. The method of claim 5, further comprising the step of partially inflating the adhered sheets prior to curing thereof.

9. The method of producing an inflatable cushion, comprising the steps of positioning a first elongated sheet of uncured, tacky rubber in a flat condition, displacing the opposite end portions of said first sheet toward one another while maintaining said end portions as well as intermediate portions spaced from one another and from said end portions longitudinally of said first sheet in coplanar flat relationship and concurrently draping the remaining portions of said first sheet which are intermediate and alternate with said flat portions thereof downwardly relative to the latter so as to form a plurality of lobes, applying pressure to each of said lobes longitudinally of said first sheet to effect adhesion of the marginal region of each inner lobe face to the marginal region of the adjacent opposite inner lobe face while inhibiting all other adhesion between each pair of inner lobe faces, positioning a second sheet of uncured, tacky rubber over said flat portions of said first sheet, pressing said second sheet and said flat portions of said first sheet against each other to effect adhesion of the former to the latter at the marginal areas thereof and at spaced and isolated inner areas thereof while inhibiting adhesion of said sheets to one another at all other areas of contact therebetween, and curing the adhered sheets.

10. The method of producing an inflatable cushion, comprising the steps of providing multi-section support means having a supporting surface, positioning a first sheet of uncured, tacky rubber on said surface of said support means, removing alternate intermediate sections of said support means from beneath said first sheet to define a plurality of spaced gaps under said first sheet, displacing the remaining sections of said support means toward one another to drape the unsupported portions of said first sheet which alternate with the supported portion downwardly relative to the latter and into said gaps so as to form a plurality of lobes, forcing said remaining sections of said support means against each other to apply pressure to each of said lobes longitudinally of said first sheet to thereby effect adhesion of the marginal region of each inner lobe face to the marginal region of the adjacent and opposite inner lobe face while inhibiting adhesion of each pair of inner lobe faces to one another at all other regions thereof, positioning a second sheet of uncured, tacky rubber over said supported portions of said first sheet, applying pressure to said second sheet in the direction of said supported portions of said first sheet and said support means at the marginal as well as spaced and isolated inner areas of said sheets to cause adhesion thereof to one another at said marginal and inner areas while inhibiting adhesion of said first and second sheets to one another at all other areas of contact therebetween, and curing the adhered sheets.

11. The method of producing an inflatable cushion, comprising the steps of providing multi-section support means having a supporting surface, positioning a first sheet of uncured, tacky rubber on said surface of said support means, placing onto the upper face of said first sheet a matrix narrower and shorter than the latter and provided with a plurality of relatively long substantially key-shaped slots extending transversely of said matrix only partly therethrough and spaced from one another longitudinally thereof and further provided with a plurality of isolated, relatively short slots arranged in rows extending transversely of said matrix and alternating with said key-shaped slots, removing alternate intermediate sections of said support means from beneath said first sheet at locations under said key-shaped slots to define a plurality of gaps under said first sheet, displacing the remaining sections of said support means toward one another to drape the unsupported portions of said first sheet which alternate with the supported portions downwardly relative to the latter and into said gaps together with the key-slotted portions of said matrix so as to form a plurality of lobes, forcing said remaining sections of said support means against each other to apply pressure to each of said lobes longitudinally of said first sheet to thereby effect adhesion of the marginal region of each inner lobe face to the marginal region of the adjacent and opposite inner lobe face while the corresponding matrix portions inhibit adhesion of each pair of inner lobe faces to one another at all other regions thereof, positioning a second sheet of uncured, tacky rubber over said supported portions of said first sheet and the short-slotted portions of said matrix thereon, applying pressure to said second sheet in the direction of said matrix and first sheet over the entire area thereof to cause adhesion of said second sheet to said supported portions of said first sheet at the marginal areas thereof and at the spaced and isolated inner areas corresponding to the locations of said short slots in said matrix, the imperforate portions of the latter inhibiting adhesion of said first and second sheets to one another at all other areas thereof, and curing the adhered sheets.

12. Apparatus for use in producing inflatable cushions, comprising means for supporting a first sheet of plastic material in flat condition, said supporting means being provided with a plurality of displaceable sections having sections defining a plurality of side-by-side spaced gaps, means for displacing the gap-defining sections of said supporting means toward one another so as to narrow said gaps and effect a draping thereinto of those portions of said first sheet originally overlying said gaps, respectively, thereby forming a plurality of folds in said first sheet, said displacing means being adapted to apply pressure to said supporting means sufficient to effect bonds between the inner surfaces of the lateral edges of each of said folds, and means for pressing a second sheet of plastic material, placed onto the remaining portions of said first sheet still flat on said supporting means, against said first sheet to effect bonds therebetween at the marginal areas of said second sheet and at spaced, isolated inner areas of said second sheet.

13. Apparatus for use in producing inflatable cushions, comprising means for substantially horizontally supporting a first sheet of uncured, tacky rubber in flat condition, said supporting means being provided with a plurality of displaceable sections having sections defining a plurality of side-by-side spaced gaps, motor means for displacing the gap-defining sections of said supporting means toward one another so as to narrow said gaps and effect a downward draping thereinto of those portions of said first sheet originally overlying said gaps, respectively, thereby forming a plurality of lobe-defining folds in said first sheet, said motor means being adapted to apply pressure to said supporting means along the direction of displacement of said sections thereof to effect bonds between the inner surfaces of the lateral edges of each of said folds, means for pressing a second sheet of uncured, tacky rubber, when placed onto the remaining portions of said first sheet overlying said sections of said supporting means, against said first sheet to effect bonds therebetween at the marginal areas of said second sheet and at spaced, isolated inner areas of said second sheet, and means for curing the bonded sheets.

14. Apparatus for use in producing inflatable cushions, comprising a horizontal table, an abutment block positioned at one end of said table, a pneumatic motor positioned at the other end of said table and provided with a reciprocal piston rod extending toward said abutment block, a jig displaceably mounted on said table between said abutment block and said pneumatic motor, said jig comprising a plurality of presser blocks loosely connected with one another, the presser block nearest said pneumatic motor being provided with a connector rod releasably connected to said piston rod, whereby upon retraction of said piston rod in a direction away from said abutment block said presser blocks are moved to an open position, while upon protraction of said piston rod in a direction toward said abutment block said presser blocks are moved together to a closed position with the presser block furthest from said pneumatic motor contacting said abutment block, and a platen adapted to be located above said jig and in alignment with said presser blocks when the same are in said closed position thereof, and to press said sheets between said platen and said presser blocks.

15. Apparatus as claimed in claim 14, each of those surfaces of said presser blocks which faces a corresponding surface of an adjacent presser block being planar.

16. Apparatus as claimed in claim 15, further comprising a pad of rubbery material attached to each of said surfaces of said presser blocks.

17. Apparatus as claimed in claim 16, said platen being equipped on that face thereof directed toward said jig with a pad of rubbery material.

18. Apparatus as claimed in claim 14, each of those surfaces of said presser blocks which faces a corresponding surface of an adjacent presser block being planar over its lower and side peripheral regions and concavely contoured over its remainder, said platen on that face thereof directed toward said jig being provided with a peripheral raised ridge and with a plurality of isolated and raised projections arranged within the space surrounded by said ridge, the height of each of said projections being equal to that of said ridge.

19. Apparatus for use in producing inflatable cushions, comprising a jig including a plurality of presser blocks adapted to be separated from each other and to be moved into side-by-side closely adjacent relationship, a plurality of spacer blocks insertable into and removable from the spaces between adjacent pairs of said presser blocks, said presser and spacer blocks when assembled in alternating relationship defining a gapless supporting surface for a first sheet of plastic material, means for moving said presser blocks into said closely adjacent relationship upon removal of said spacer blocks from the spaces between said presser blocks to effect a downward draping into said spaces of those portions of said first sheet previously supported by said spacer blocks to thereby form a plurality of folds in said first sheet, means for exerting pressure against the outermost ones of said presser blocks in opposed directions inwardly of said jig to effect adhesion between the juxtaposed side and bottom marginal areas of each pair of inner fold faces, means for pressing a second sheet of plastic material onto those portions of said first sheet supported by said presser blocks in such a manner as to effect adhesion between said sheets at the marginal areas of said second sheet and at spaced, isolated inner areas of said second sheet, and means for inhibiting adhesion at all other locations.

References Cited in the file of this patent

UNITED STATES PATENTS

| | | |
|---|---|---|
| 721,192 | Holland | Feb. 24, 1903 |
| 1,603,465 | Hopkinson | Oct. 19, 1926 |
| 1,970,803 | Johnson | Aug. 21, 1934 |
| 2,347,101 | Harding | Apr. 18, 1944 |
| 2,488,993 | Teague | Nov. 22, 1949 |
| 2,670,501 | Michiels | Mar. 2, 1954 |
| 2,703,770 | Melzer | Mar. 8, 1955 |
| 2,712,157 | Holte | July 5, 1955 |
| 2,781,078 | Dovidio | Feb. 12, 1957 |
| 2,926,720 | Gosman | Mar. 1, 1960 |

UNITED STATES PATENT OFFICE
CERTIFICATE OF CORRECTION

Patent No. 3,048,514                                          August 7, 1962

Gerard O. Bentele et al.

It is hereby certified that error appears in the above numbered patent requiring correction and that the said Letters Patent should read as corrected below.

Column 9, line 23, for "supporting" read -- supported --; line 48, for "asid" read -- said --; column 10, lines 15 and 16, for "portion" read -- portions --.

Signed and sealed this 27th day of November 1962.

(SEAL)
Attest:
ESTON G. JOHNSON
~~ERNEST W. SWIDER~~
Attesting Officer

DAVID L. LADD
                                                        Commissioner of Patents